(12) United States Patent
Zaniolo et al.

(10) Patent No.: US 7,746,782 B2
(45) Date of Patent: Jun. 29, 2010

(54) TRAFFIC CONTROL IN AN INTERNET PROTOCOL NETWORK

(75) Inventors: Luiz Cesar Zaniolo, Boca Raton, FL (US); Francisco Olympio Marcon da Rocha, Boca Raton, FL (US); Robinson Osmar Lima, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1323 days.

(21) Appl. No.: 10/814,407

(22) Filed: Mar. 31, 2004

(65) Prior Publication Data

US 2005/0220034 A1 Oct. 6, 2005

(51) Int. Cl.
*G01R 31/08* (2006.01)
*H04J 3/12* (2006.01)

(52) U.S. Cl. .................. 370/235; 370/241; 370/522
(58) Field of Classification Search .............. 370/235, 370/241
See application file for complete search history.

(56) References Cited

U.S. PATENT DOCUMENTS

| | | | |
|---|---|---|---|
| 5,574,770 A | 11/1996 | Yoo et al. ............... 379/34 |
| 6,269,398 B1* | 7/2001 | Leong et al. ............. 709/224 |
| 6,285,660 B1* | 9/2001 | Ronen .................... 370/259 |
| 6,377,548 B1 | 4/2002 | Chuah .................... 370/233 |
| 6,978,144 B1* | 12/2005 | Choksi ................... 455/452.2 |
| 2002/0126699 A1* | 9/2002 | Cloonan et al. .......... 370/468 |
| 2003/0218987 A1 | 11/2003 | Loader et al. |
| 2008/0031439 A1* | 2/2008 | Synnestvedt et al. ... 379/221.01 |

* cited by examiner

*Primary Examiner*—Kevin C Harper

(57) ABSTRACT

A method and system based in part on a current network traffic determination and a predetermined acceptable Quality of Service parameter, the system sets a current state of available system services. In order to set the available system services, the apparatus refers to a database containing a listing of services for a given network. The database includes a hierarchy of the services correlated to the amount of bandwidth necessary to provide a given service. The determination is made by the apparatus, as to whether the amount bandwidth necessary to provide a particular type of service would degrade the QoS below an acceptable level if the service was provided on the network at the time of the determination. If degradation would occur, the service is made unavailable until the traffic level subsides to a point at which providing the service would not have an adverse affect on the QoS the network.

28 Claims, 6 Drawing Sheets

| Type of Service | Level of Bandwidth Required |
|---|---|
| Point-to-Point Telephone Call | Low |
| Point-to-Point Video Call | Medium |
| Teleconference Call | Medium |
| Video Conference Call | High |

| Type of Service | Level of Bandwidth Required | Current Availability Status |
|---|---|---|
| Point-to-Point Telephone Call | Low | Yes |
| Point-to-Point Video Call | Medium | Yes |
| Teleconference Call | Medium | Yes |
| Video Conference Call | High | No |

TRAFFIC CONTROL IN AN INTERNET PROTOCOL NETWORK

FIELD OF THE INVENTION

The present invention relates generally to switching systems, and specifically to a method and system for managing traffic and services on a switching system.

BACKGROUND OF THE INVENTION

Switching systems provide data transfer services between at least two end users. In one implementation the data transferred relates to communication services, such as, voice calls, video conferences, etc. In such implementations, a user may access an end point, which may be a telephone, video phone, networked computer or any other communication element and submit a service request to communicate with another end point. Generally, a service request is transmitted from one end point to a second end point across the switching system. The switching system may be scalable and include a plurality of end points connected via a network of routers. The routers transfer messages from a service requesting end point to a destination end point. Specifically, for example, when a voice call is placed, voice data may be digitized and inserted into data packets. Each data packet includes a header that details an address corresponding to the destination end point. The data packet is transmitted from the service requesting end point to a first router which transfers the packet to another router according to a dynamically determined data transmission path. The router transfer is executed repeatedly until the message packet reaches the destination end point.

In an exemplary network connecting two end points, there may be a plurality of routers available to transfer data between two end points. One method of quantifying the performance of a given network is a Quality of Service (QoS) parameter associated with the network. Network characteristics used to determine the QoS include a measure of the current traffic or load on the network, a measure of properly transmitted messages, a measure of improperly transmitted messages, the number of end points served, and the types of services available. It is critical to maintain an acceptable QoS even during periods of high network traffic. Optimizing the number of messages properly transmitted, that is providing an acceptable level of QoS, while minimizing the infrastructure (e.g., number of routers on a given network) is a significant challenge in the area of telecommunications.

One method of maintaining an acceptable QoS level relates to prioritizing the types of communication services available. On a given network the different types of services, such as voice calls or video conference calls may be associated with a priority level. Accordingly, based on a measure of the traffic level on the network, a networked base station may disconnect one or more already connected lower priority data transfers to maintain QoS.

This method for maintaining acceptable levels of QoS, however, has significant limitations. For example, assuming a low priority is associated with a telephone call, this method involves terminating a user's established telephone conversation, in favor of a higher priority data transfer. While this known solution may bolster QoS on a given network, it generally unacceptable to a user to have an established, ongoing telephone conversation terminated in the sole interest of maintaining a high QoS for the network.

Another method for maintaining high levels of data transfer involves a process of throttling data through a router on a network based on a priority associated with the data. However, this approach only addresses determining the timing associated with transmitting data flowing through a given router.

Yet another method for maintaining the quality of data transfers on a switching system involves controlling an overload condition of a main processor on a distributed switching system by informing lower level processors of an overload state in the main processor. With the overload notice, the main processor delegates the functionality of automatically calculating parameters of network traffic to the lower level processors. However, this may put a significant burden on the lower level processors associated with such a switching system.

SUMMARY AND OBJECTS OF THE INVENTION

The foregoing and other problems and deficiencies in the prior art are overcome by the present invention, which provides a method and system for managing traffic on a network, as well as maintaining a viable Quality of Service (QoS) metric for the network. The invention is implemented as a system that determines a level of system traffic across a system at a given time and selectively, and temporarily, suppresses service requests that would significantly degrade the QoS associated with the network.

The selective suppression of the present invention is based in part on the current traffic determination and a predetermined acceptable QoS parameter, and allows the system to set a current state of available system services. In order to set available system services, the system, in an illustrative embodiment, refers to a database containing a listing of services for a given network. The database includes a hierarchy of the services correlated to the amount of bandwidth necessary to provide a given service. In the illustrative embodiment, the determination is made as to whether the necessary amount of bandwidth to provide a particular requested type of service would degrade the QoS below an acceptable level. If degradation below the acceptable level would occur, the service is made unavailable until the traffic level subsides to a point at which providing the service would not have an adverse affect on the network QoS.

In the illustrative embodiment of the invention, an end point transmits a service request to a service determination apparatus (e.g., a central server). The central server determines whether the service requested is currently available on the network, as discussed above. If the service is currently available, the central server notifies the end point that it may proceed with the service request and initiate a message transfer with another end point. If the central server determines that the service is not available, the requesting end point is notified that the service requested is temporarily unavailable. The central server may be configured to transmit a message to the requesting end point when the service is available.

The foregoing objects are achieved and other features and advantages of the present invention will become more apparent in light of the following detailed description of exemplary embodiments thereof, as illustrated in the accompanying drawings, where:

BRIEF DESCRIPTION OF THE DRAWINGS

FIG. 3 is an exemplary table from a service availability module integrated to the central server of FIG. 2.

FIG. 5 is an alternative exemplary table from a service availability module integrated to a central server.

DETAILED DESCRIPTION

Generally, and as will be discussed in detail below with respect to the FIGS. 1-7, under the present invention, service requests and subsequent service data transfers are communicated between two end points or end user devices. The invention relates to a method and system for optimizing provision of the requested service(s) and maintaining an acceptable QoS on a network during periods of very high message traffic.

The invention will now be described in detail with reference to the accompanying drawings.

Figure 1:
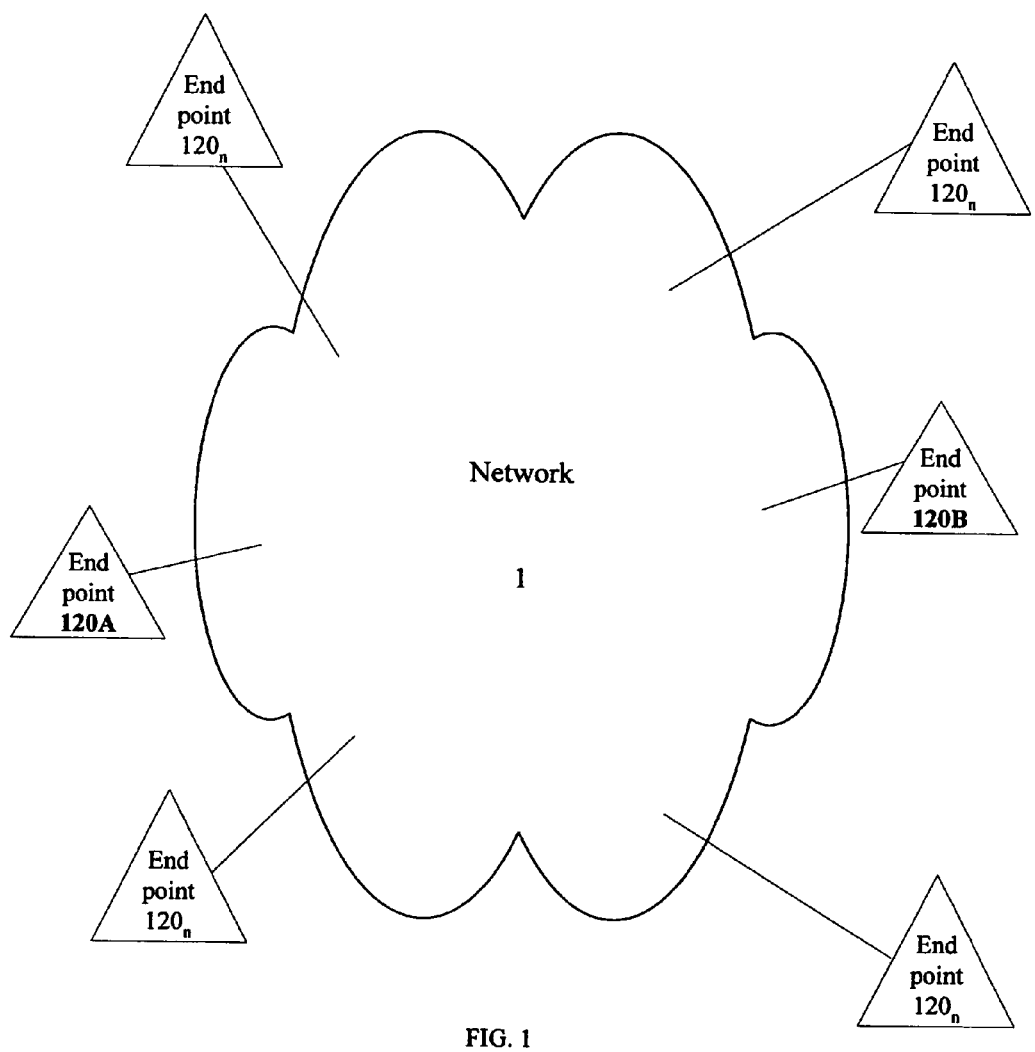
FIG. 1 is a schematic diagram of a switching system useful in provision of telecommunications services as is known.

FIG. 1 is a schematic diagram of a switching system for providing telecommunication services between end users at 0 through n end points $120_n$, which are connectable to each other through a network 1.

For purposes of illustration, it is assumed that communication services are desired between two end users, at end points 120A and 120B, respectively. As is known in the art, communication in a typical network is effected through routers distributed in the network with a connection path established via one or more of the routers as determined by the rules of the network.

Figure 2:
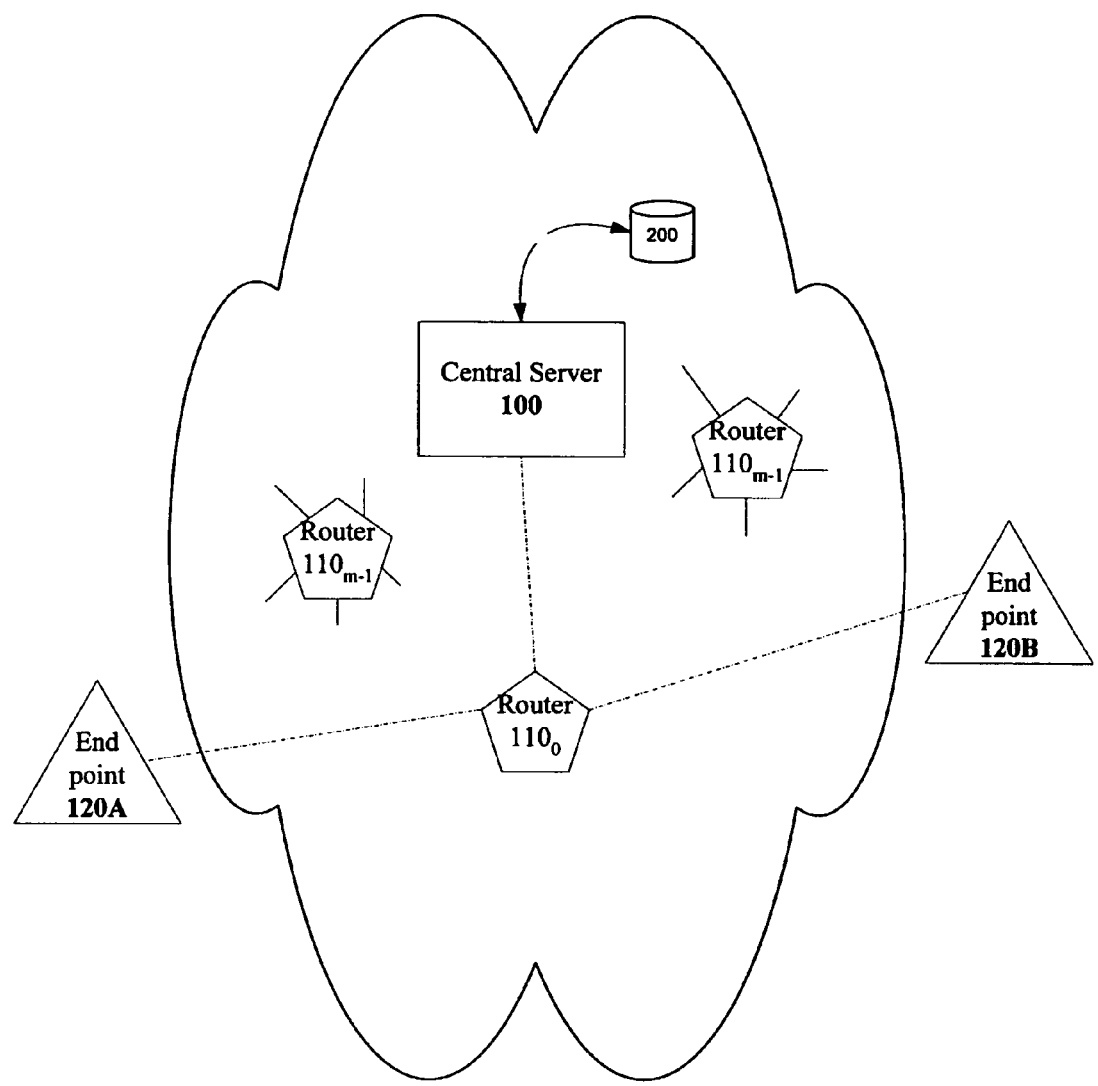
FIG. 2 is a schematic diagram of an exemplary switching system.

As illustrated in FIG. 2, for purposes of simple illustration of the present invention, connection is made from end point 120A to end point 120B through a single router $110_0$. Router $110_0$ is in communication with a central server 100 which controls the network and which server is in communication with Service Availability Module 200. While one configuration of connectivity is shown for purposes of illustration, it will be understood that a different number of m routers in different connectivity patterns to each other and to the central server are equally possible as will be determined by the rules of the particular network implementation, the connectivity configuration of which is immaterial to function of the present invention.

In an embodiment where more than one router is part of the connectivity configuration, it will be understood by those skilled in the art that each such router will be factored into network traffic determinations and implementation of the present invention to manage such system throughput for a given network.

Router $110_0$ accepts a service request/data message from first end point 120A and forwards the information according to a destination address within the request/message ultimately to second end point 120B through a path formed in the network as is understood. During certain periods of high message traffic on the network, it is possible for the network to become overloaded. In an overload condition, routers may begin to randomly drop or lose data messages. Thus, depending on the volume of messages on the network, the number of communicating end points, and the number of routers available to direct network traffic between end points $120_n$ at that particular time, the routers may randomly drop messages during overload periods. If such message drop or data loss continues unchecked, there is a direct adverse effect on the Quality of Service (QoS) associated with the network, which is a measure of ability of the network to exchange messages without dropping data. An exemplary user would experience such degradation of the QoS, e.g., as a significant increase in static on an established voice call or even call drop.

The present invention prevents such QoS degradation by selectively suppressing service requests on the network during periods of high message traffic where message drop or data message loss could significantly degrade network performance. Generally, a service provider will have a range of services available for end users at any given time. For example, end users may request among available services which include, but are not limited to, point-to-point telephone calls, point-to-point video phone calls, teleconferences, or video conferences. Each of these services requires a certain amount of bandwidth to establish and maintain that respective service. A service provider will usually have a total available bandwidth and a predefined amount of bandwidth available for providing such services (e.g., in transferring data packets containing information related to providing the services). A primary goal of the service provider is to maximize the use of a given infrastructure (network), while minimizing equipment and operating costs.

Figure 4:
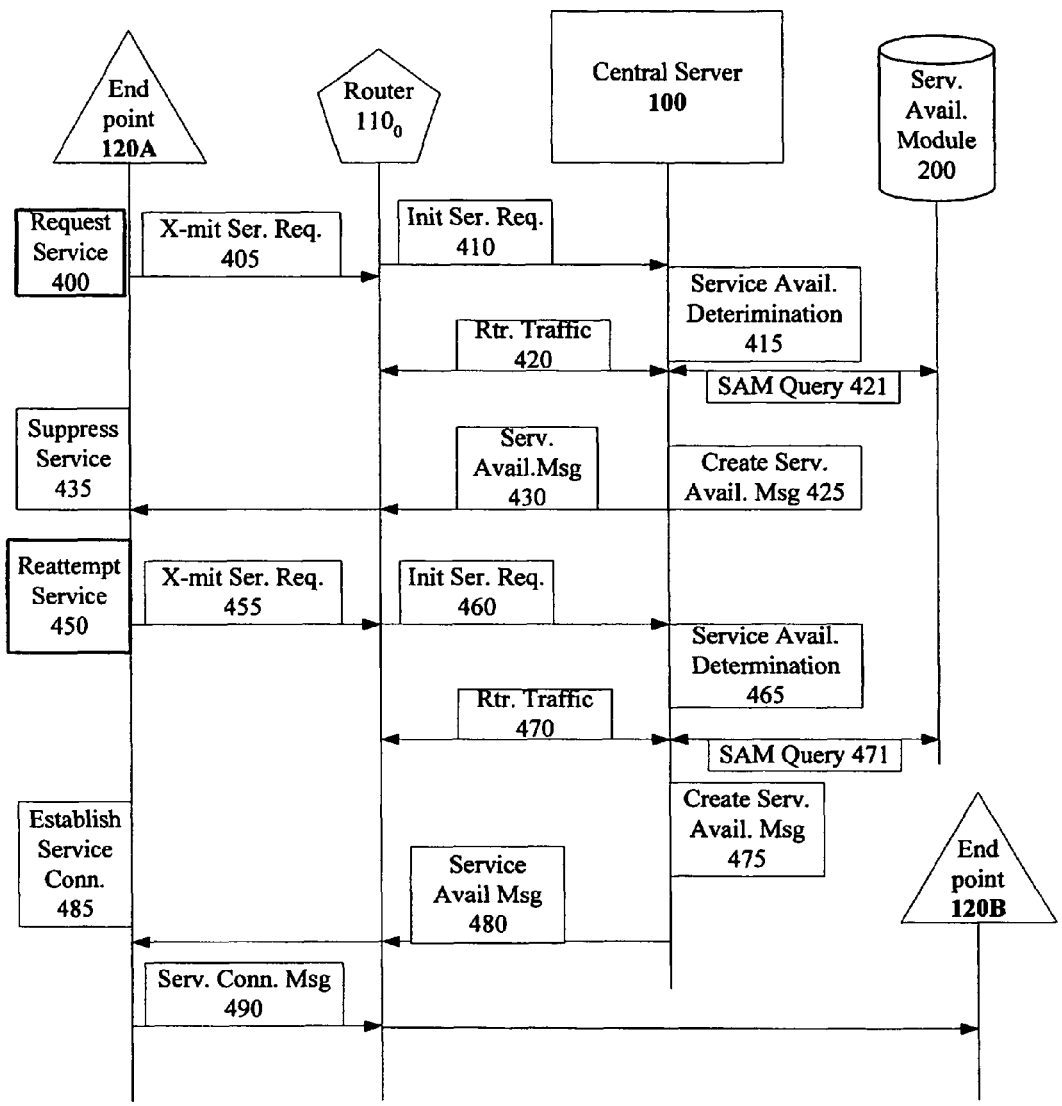
FIG. 4 is a flow diagram illustrating the process of determining the current service availability for the switching system shown in FIG. 2, according to the illustrative embodiment of the invention.

As discussed above, the present invention provides a bandwidth management solution to the problem of managing a high traffic network without significant degradation in QoS. As will be explained in further detail below with reference to FIG. 4, shown in FIG. 2, end point 120A is configured to submit a service request to the network to communicate with end point 120B. The service request is transmitted from end point 120A to router $110_0$. The router $110_0$ recognizes the message as a service request and routes the request to central server 100, via any intermediate routers as necessary. While no intermediate routers are shown for purposes of illustration, a particular network configuration may implement any number of routers to establish the end-to-end communication between 120A and 120B.

The central server 100 processes the service request to determine whether or not the type of service requested is currently available on the network. Central server 100 bases the service availability determination on a measurement of network traffic, in coordination with service performance parameters stored on the central server (e.g., acceptable QoS, types of services provided, corresponding bandwidth requirements, etc.). After the determination is made, the central server notifies the requesting end point 120A whether the service requested is currently available on the network. If the service is available, end point 120A is allowed to establish a service connection with end point 120B. Data messages associated with providing a given service are subsequently routed through e.g., router $110_0$ to connect to end point 120B. Otherwise, end point 120A is informed that the requested service is temporarily unavailable.

In making the service availability determination, central server 100 conducts a network traffic level determination and queries a service availability module 200 integrated with the central server 100. The network traffic level determination is a measure of the message load handled by the m routers $110_m$ on a network at a given time. For example, in an illustrative embodiment of the present invention, the central server 100 sends a load query message to each router $110_m$ in the network requesting a current message drop percentage rate (number of messages dropped/number of messages properly routed) for the respective routers on the network. Each router transmits a response message with router load information that includes the drop percentage.

The central server 100 stores the router load data for message traffic analysis. The central server 100 may determine the current router load for the network by calculating the average (AV) message drop percentage and the standard deviation (SD) for a group of samples. A calculated drop rate for the network at a given time based on these values may be calculated using the following formula:

$$\text{Drop Rate} = MDP_{AV} + (SD/k)$$

wherein the variable k is a constant that incorporates factors associated with an undistributed load into the drop rate metric. The central server 100 may use the drop rate to compare with a stored values of required bandwidth associated with a requested service in the service availability module.

With reference to FIG. 3, an illustrative service availability module 200 is shown which, in the exemplary embodiment, includes data related to the characteristics associated with a full range of services that an end point $120_n$ may request. Two primary parameters included in the module are a "Type of Service" parameter and a "Level of Bandwidth Required" parameter. For example, if an end point 120A requests a point-to-point telephone call, the central server 100 queries the module 200. The module 200 correlates a point-to-point telephone call, with a "low" level of bandwidth required in order to provide that type of service. Other parameters may be included in addition to or in lieu of the foregoing (for example as will be discussed with reference to FIG. 5 below), as deemed appropriate for a particular implementation.

Accordingly, the central server 100 creates a service availability message that indicates whether there is enough available bandwidth to provide the end point 120A with the service requested. Depending on the actual implementation, denials of service may be based on factors ranging from the amount of bandwidth requested (as illustrated herein), priorities associated with requesting end points, requested services or any number of alternate service denial schemes. As will be discussed in greater detail below, the requesting end point 120A either proceeds with establishing a service connection with another end point, e.g., 120B, or the requesting end point 120A suppresses the service request. The Current Availability Status parameter illustrated in FIG. 5 is implemented in an embodiment of the invention as will be described below in relation to FIG. 6.

FIG. 4 illustrates a flow diagram related to exemplary service request suppression 400 and subsequent service request reattempt 450 processes. The processes illustrate the communications between a service requesting end point 120A, a representative network router $110_0$, and central server 100. End point 120A generates a service request message 405 requesting a specific type of service from a service provider. The request message 405 is transmitted to router $100_0$, which recognizes the message 405 as an initial service request and transmits it to central server 100 in step 410.

The central server 100 receives and processes the message 405. In step 415, the central server 100 conducts a two-part service availability determination (1) a current network traffic determination (420) and (2) a service availability module query (421, described above). The network traffic determination involves central server transmitting a current traffic level request message 420 to the routers on the network. Central server 100 creates a service availability message 430 in step 425, based on the resulting router load response data, in coordination with the result of the service availability module query from step 421. The service availability message 430 indicates whether or not the end point 120A may proceed with establishing a service connection with end point 120B. In the exemplary embodiment of the invention shown in FIG. 4, service availability message 430 is shown to indicate that the service should be suppressed, i.e. there is not enough available bandwidth on the network to provide the service requested without significantly degrading the acceptable QoS for the network. End point 120A then suppresses the service in accordance with the service availability message 430, in step 435.

Subsequently, as shown in FIG. 4 end point 120A reattempts to establish the service shown in a service request reattempt 450. Again, end point 120A transmits a service request message 455 to router $110_0$, which in turn identifies message 455 as an initial service request and sends the message 460 to central server 100. Central server 100 again conducts the service availability determination 465, in steps 470 and 471 and determines whether there is sufficient bandwidth available on the network to facilitate the requested service without significant degradation of the QoS. For purposes of illustration, a positive determination of service availability is made where central server 100 creates and transmits the service availability message 480 in step 475 indicating that the requested service is now available. End point 120A receives the service availability message 480 and initiates establishing a service connection in step 485. The end point 120A transmits a service connection message 490 to router $110_0$, which in turn routes message 490 to end point 120B, establishing a service connection between end points 120A and 120B. It is also possible to configure the central server 100 to forward the service request message to the destination end point 120B if the request is approved.

FIG. 5 illustrates an alternative embodiment of the invention, wherein the service availability module further maintains a current service availability status list. In FIG. 5, the service availability module 200 also includes an additional primary parameter, "Currently Availability Status." Rather than transmitting a load request to the routers $110_m$ attached to a given network only upon receipt of a service request (as shown in FIG. 4), in this embodiment the central server maintains a current status list for the services available to be requested by an end point/end user.

Figure 6:
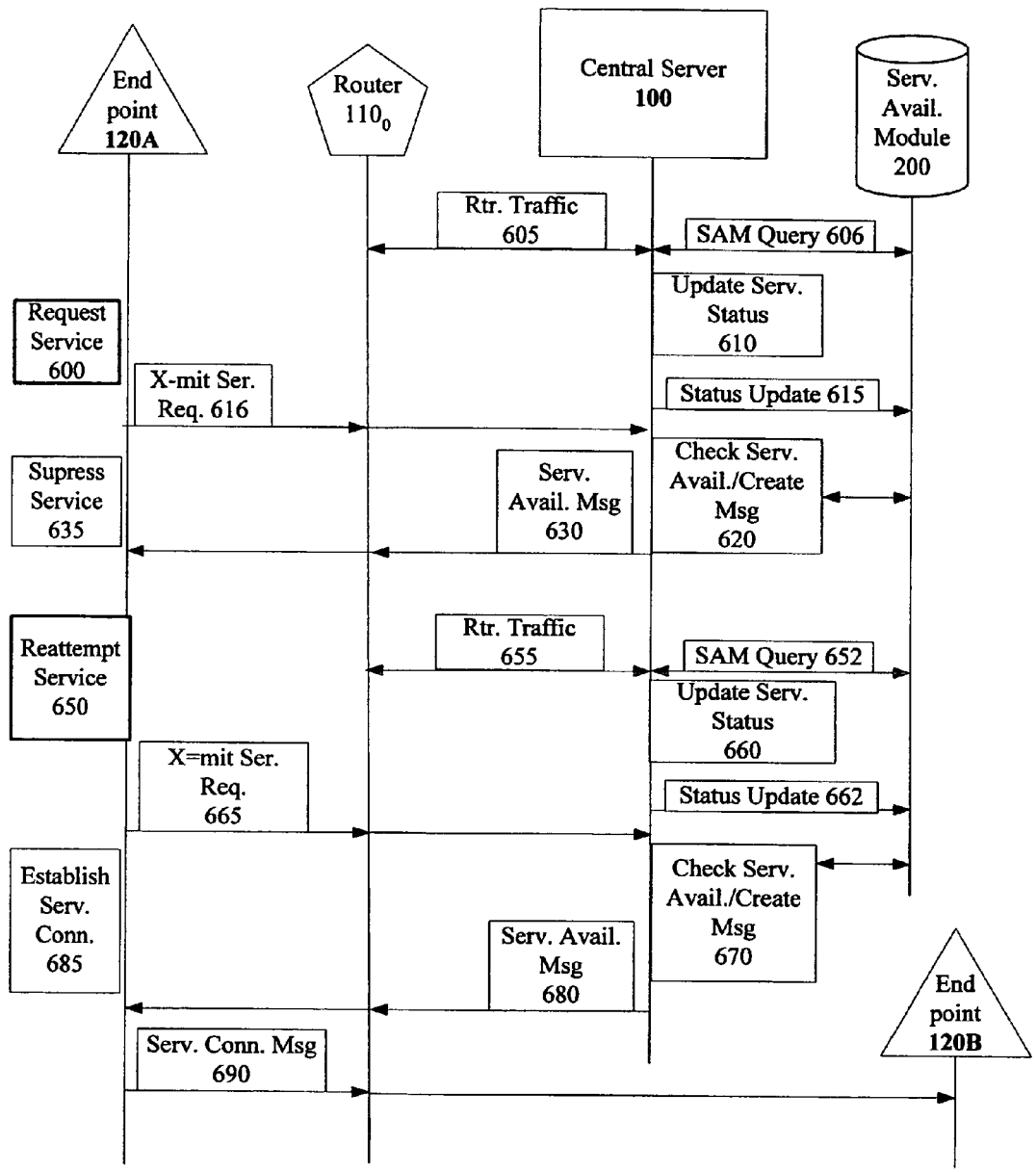
FIG. 6 is a flow diagram illustrating the process of determining the current service availability in conjunction with the table of FIG. 5, according to an alternate embodiment of the invention.

FIG. 6 illustrates a flow diagram related to exemplary service request suppression 600 and subsequent service request reattempt 650 processes. As shown in the illustrative embodiment depicted in FIG. 6, central server 100 periodically conducts router load requests, measuring the network traffic in accordance with a router load polling interval determined for a given network (in steps 605 and 655). Based on the router traffic loads (determined from steps 605 and 655), during a service availability module query 606, central server 100 may correlate the router load results with the required bandwidth for specific services to make a current availability determination in step 610. After which, the central server 100 may update the "Current Availability Status" parameter (FIG. 5) within the service availability module 200 indicating whether each of the respective services is currently available in steps 615, 662.

Accordingly, when the end point 120A transmits service request messages 616, 665, the central server 100 simply identifies the type of service requested and checks the current service status stored in the module in steps 620, 670. Central server 100 subsequently transmits a service availability message 630, 680 indicating whether the end point 120A should suppress the service requested as in step 635 or the end point 120A may proceed with establishing a service connection with end point 120B as in steps 685 and 690.

Figure 7:
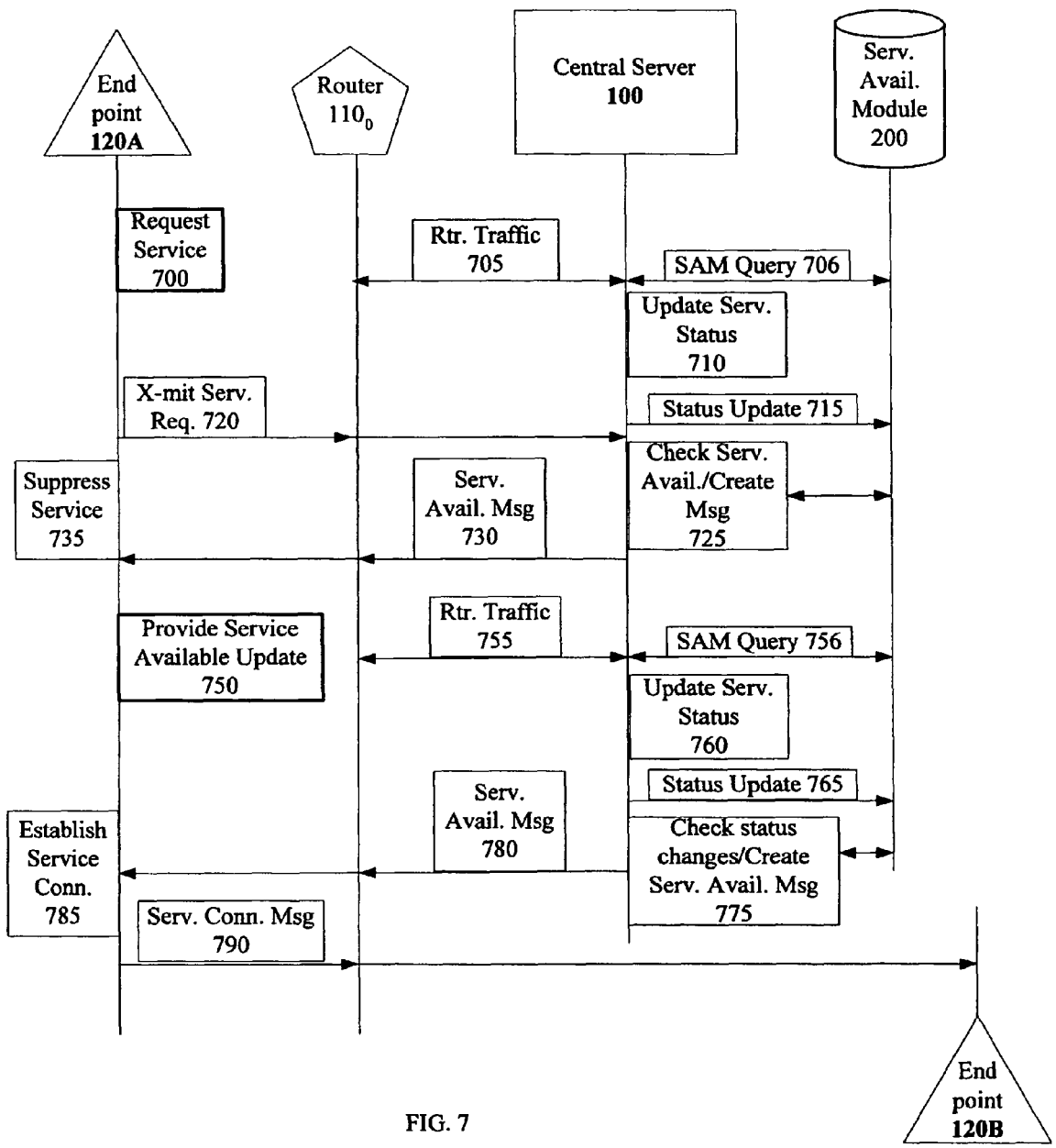
FIG. 7 is a flow diagram illustrating the process of determining the current service availability, according to another embodiment of the invention.

FIG. 7 illustrates another alternative embodiment of the present invention, related to exemplary service request suppression 700 and subsequent service availability update 750 processes. In FIG. 7, the central server 100 transmits a service available message to a requesting end point associated with a denied service request when the service becomes available. It will be understood that although FIG. 7 illustrates the periodic router load routine described in FIG. 6, other embodiments of the invention may include similar or other functionality. As shown in FIG. 7, central server 100 periodically requests router load data and conducts a Service Availability Module query to determine a service availability for each of the services on a representative network (e.g., the services shown in FIG. 5) in steps 705 and 706. Based on the data obtained therein, a service availability status is determined in step 710 and the corresponding data field in the service availability module 200 is updated with a current service availability status data in step 715.

End point 120A transmits a service request 720, which is routed to central server 100. Based on the determination in step 710, the requested service is not currently available. Central server 100 checks the availability status in the service availability module 200, creates and transmits (725) a service availability message 730 to the end point 120A indicating that the service request has been denied. Accordingly, end point 120A suppresses the service in step 735.

As part of a service denial, in step 725, central server 100, the central server then stores data in a service availability module 200 (e.g., a negative request queue) including the type of service requested and the address of the requesting end point in the service availability module 200. As the central server 100 periodically updates the service availability status (steps 755, 756, 760, 765), a change in status for a particular service may initiate the central server 100 searching the availability module 200 for records indicating a denied request corresponding to the recently updated availability of a specific service as in step 775. Based on the stored parameters, the central server 100 may create a service availability message 780 to the requesting end point 120A that a previously denied requested service is now available. Accordingly, end point 120A is now free to establish a service connection with end point 120B, as in steps 785 and 790.

While the present invention has been described with reference to particular embodiments thereof for purposes of illustration, other alternative embodiments or implementations according to the various teachings of the present invention will be understood by whose skilled in the art and are achieved without departing from the spirit and scope of the invention. It is therefore intended that the present invention is not limited to the disclosed embodiments described herein but should be defined in accordance with the claims that follow.

We claim:

1. A method for managing traffic on a switching system comprising:
   receiving a service request from an end point, said end point being one of a plurality of communications endpoints on a communications system, said plurality of endpoints being connected to each other through a network of routers, each said service requests passing through at least one of said routers to a server;
   determining a system traffic level responsive to receiving said service request, said system traffic level being determined by said server and indicating the current load level of system traffic across said communications system;
   correlating the determined system traffic level with a predetermined level of available service functionality; and
   establishing an available services list, wherein said communications system is a telecommunications system including a plurality of telecommunications end points selectively communicating with each other, said method further comprising
   said server creating a correlation table comprising data fields including an upper traffic level limit and a lower traffic level limit and a list of services provided to an end point when the determined traffic level falls within the upper and lower traffic limits.

2. The method of claim 1, further comprising:
   determining whether the service request is one of the available services on said available services list;
   generating a service availability message for the requested service; and
   transmitting the service availability message to the requesting end point.

3. The method of claim 1, wherein the system traffic determination comprises periodically sending router load requests to said routers and measuring system traffic responsive to router traffic loads and providing said system traffic measurement responsive to receiving said service request.

4. The method of claim 2, wherein the system traffic may include traffic from point to point connections and conference connections between said end point and one or more other end points of said plurality of communications end points and determining the system traffic level is initiated upon receipt of the service request.

5. The method of claim 1, wherein the correlation table provides weighted services availability.

6. The method of claim 1, wherein each of said plurality of telecommunications end points includes a communications device and the correlation table includes weighted services that are distributed according to a service class determined by the amount of bandwidth necessary to implement a service.

7. The method of claim 6, wherein the service class includes voice-based communication services, the voice-based communication services including traffic point to point voice calls and teleconferences.

8. The method of claim 6, wherein the service class includes video-based communication services, the video-based communication services including traffic point to point video calls and video conferences.

9. The method of claim 2, wherein the service availability message notifies the end point that the requested service is available based on the traffic level determination.

10. The method of claim 2, wherein the service availability message notifies the end point that the requested service is unavailable based on the traffic level determination.

11. The method of claim 10, wherein when the service is unavailable, the end point informs a user that the requested service is temporarily unavailable.

12. The method of claim 10, wherein when the service is unavailable, said server creates an entry on a negative request queue corresponding to the service request.

13. The method of claim 12, wherein the entry on the negative request queue includes a field identifying the service requesting end point.

14. The method of claim 12, wherein the entry on the negative request queue includes a field indicating the type of service requested.

15. The method of claim 12, further comprising transmitting a status update message from the server to the end point when the requested service becomes available.

16. The method of claim 2, further comprising the requesting end point establishing a connection through the switching system to provide a user with the service requested.

17. A method for conducting traffic management on a network comprising:
   creating in a communications network server a current list of available system service, said current list listing system services available to communications network end points;
   updating the list of available system services based on a network traffic measurement and network performance parameters associated with system services, said measurement measuring the current level of traffic on a communications network of a plurality of said communications end points connected to a network of routers, each selectively communicating with each other through at least one of said routers;
   creating a correlation table comprising data fields including an upper traffic level limit and a lower traffic level limit and a list of services provided to an end point when the determined traffic level falls within the upper and lower traffic limits; and
   selectively suppressing network device service requests received by said communications network server through one of said routers based on whether a requested service corresponds to an entry on the current list of available system services.

18. The method of claim 17, wherein a network end point transmits the network device service request to said one router.

19. The method of claim 17, wherein a network end point receives a service availability message through a connected router from a communications network server indicating whether the requested service will be provided.

20. The method of claim 19, wherein when the network end point receives a service availability message through said connected router indicating the requested service will not be provided, the network end point receives a second message through said connected router when the requested service becomes available from said communications network server.

21. The method of claim 17, wherein said communications network is a telecommunications network and the network performance parameters include a list of system defined services and associated bandwidth capacity levels.

22. An apparatus for managing traffic on a switching system comprising:
   receiving means for receiving a service request from a router connected to a requesting end point, said requesting end point being one of a plurality of communications endpoints on a communications system, said plurality of communications endpoints being connected to each other through a network of routers, each said service requests passing through at least one of said routers;
   traffic determining means for determining the level of system traffic across said communications system at a given time;
   correlation means for correlating the determined traffic level with a predetermined level of available service functionality; and
   establishing means for establishing an available services list for said requesting end point, wherein said switching system is in a telecommunications system including a plurality of telecommunications end points selectively communicating with each other, said apparatus further comprising
   means for creating a correlation table comprising data fields including an upper traffic level limit and a lower traffic level limit and a list of services provided to an end point when the determined traffic level falls within the upper and lower traffic limits.

23. The apparatus of claim 22, further comprising:
   available services determining means for determining whether the service request is one of the available services on said available services list;
   generating means for generating a service availability message for the requested service.

24. The apparatus of claim 23, wherein said communications system is a telecommunications system, said apparatus further comprising:
   transmitting means for transmitting the service availability message to said router connected to the requesting end point.

25. The apparatus of claim 24, wherein the service availability message notifies the end point that the requested service is unavailable, said apparatus creates an entry on a negative request queue corresponding to the service request; and notifies the end point through said router when the requested service becomes available.

26. An apparatus for conducting traffic management on a network comprising:
   receiving means for receiving a service request from a router connected to a requesting end point, wherein said network is in a telecommunications network, said requesting end point being one of a plurality of telecommunications endpoints on said telecommunications network, said plurality of telecommunications endpoints being connected to each other through a network of routers, each said service requests passing through at least one of said routers;
   creating means for creating a list of available system services for said plurality of telecommunications end points, said creating means creating a correlation table comprising data fields including an upper traffic level limit and a lower traffic level limit and a list of services provided to an end point when the determined traffic level falls within the upper and lower traffic limits;
   updating means for updating the list of available system services and the correlation table based on a network traffic measurement of the network traffic load at a given time and network performance parameters associated with system services; and
   suppressing means for selectively suppressing network device service requests based on whether the requested service corresponds to an entry on the list of available system services.

27. The apparatus of claim 26, wherein the updated list of available services indicates which services are available to for said plurality of telecommunications end points based on the network traffic measurement, the apparatus further comprising:
   transmitting means for transmitting a first message through one of said routers to a requesting network telecommunications device that the requested service should be suppressed; and
   said transmitting means subsequently transmits a second message through said one router to the network telecommunications device when the requested service becomes available.

28. A method for managing traffic on a switching system comprising:
   receiving a service request from an end point, said end point being one of a plurality of communications endpoints on a communications system, said plurality of endpoints being connected to each other through a network of routers, each said service requests passing through at least one of said routers to a server;

determining a system traffic level responsive to receiving said service request, said system traffic level being determined by said server and indicating the current load level of system traffic across said communications system;

correlating the determined system traffic level with a predetermined level of available service functionality;

establishing an available services list;

determining whether the service request is one of the available services on said available services list;

generating a service availability message for the requested service; and transmitting the service availability message to the requesting end point, wherein the service availability message notifies the end point that the requested service is unavailable based on the traffic level determination; and when the service availability message notifies the end point that the requested service is unavailable, forwarding the service request to a second end point when the requested service becomes available.

* * * * *